United States Patent
Makowan

Patent Number: 6,050,294
Date of Patent: Apr. 18, 2000

[54] SPRING RETURN CHECK VALVE

[75] Inventor: Ted J. Makowan, Schaumburg, Ill.

[73] Assignee: Val-Matic Valve and Manufacturing Corp., Elmhurst, Ill.

[21] Appl. No.: 09/270,725

[22] Filed: Mar. 17, 1999

[51] Int. Cl.[7] .................................. F16K 15/00
[52] U.S. Cl. ...................... 137/527; 137/527.2; 251/337
[58] Field of Search ............................. 137/527, 527.2; 251/337, 358

[56] References Cited

U.S. PATENT DOCUMENTS

| | | | |
|---|---|---|---|
| 93,294 | 8/1869 | Frisbie | 137/527 |
| 107,605 | 9/1870 | Foster | 137/527 |
| 735,912 | 8/1903 | Schrotz | 137/527 |
| 985,122 | 2/1911 | Ashmusen | 137/527 |
| 1,285,110 | 11/1918 | Funk | 137/527 |
| 1,393,204 | 10/1921 | Daggett | 137/527 |
| 2,356,815 | 8/1944 | Bischoff | 137/527 |
| 3,331,391 | 7/1967 | Meridinyan | 137/527 |
| 3,613,720 | 10/1971 | Welch et al. | 137/527 |
| 3,640,306 | 2/1972 | Vogt | 137/527 |
| 3,990,471 | 11/1976 | Schutzer et al. | 137/527 |
| 4,027,695 | 6/1977 | Schnatmeyer et al. | 251/337 |
| 4,274,436 | 6/1981 | Smith | 137/527 |
| 4,330,006 | 5/1982 | Eck et al. | 137/527 |

OTHER PUBLICATIONS

Rubber Flapper Check Valve With Spring Return Attachment, Valve and Primer Corp, Schaumburg, IL; Drawing No. S100–SR; Dated Mar. 5, 1984.

Dresser Swing Check Valves for Water, Wastewater and Industrial Application; Dresser Manufacturing Division, Dresser Industries Inc. Anniston, AL 36202.

*Primary Examiner*—Denise L. Ferensic
*Assistant Examiner*—Joanne Y. Kim
*Attorney, Agent, or Firm*—Hill & Simpson

[57] ABSTRACT

A resilient disc check valve with a spring return mechanism is provided. The spring return mechanism is contained entirely within the valve body. The spring return mechanism is in the form of a leaf spring or similar structure which engages a back side of the disc and does not require any attachment to the disc by way of fasteners or other mechanisms.

19 Claims, 2 Drawing Sheets

SPRING RETURN CHECK VALVE

BACKGROUND OF THE INVENTION

Field of the Invention:

The present invention relates generally to check valves and, more specifically, to check valves with a spring return mechanism. Still more specifically, the present invention relates to check valves having a resilient disc in combination with a spring return mechanism.

Check valves having a closure mechanism consisting of a resilient disc have been commonly used in water and wastewater systems to prevent reverse flow in such systems. Typically, these resilient disc check valves have a disc that is mounted within the valve body at a 45 degree angle with respect to the flow path when in a closed position. The disc includes a hinge which is typically integrally molded to the disc and is rigidly held in place in the valve body. The resilient disc typically pivots about 35 degrees to an open position thereby providing a full flow area or near full flow area. The 35 degree span of movement is preferred because it provides a short closing stroke which avoids a slamming of the valve in a closed position. The above-described design is reliable because there is only one moving part—the resilient disc. Further, the integral connection between the hinge and the disc avoids any penetrations of the disc for a connection between the hinge and the disc.

While the standard resilient disc check valve design is reliable and economical, many applications demand the incorporation of a spring return element. Spring return elements are desirable because they prevent the occurrence of valve slam and water hammer by biasing the disc into the closed position before the flow reverses in the pipe. In contrast, if the flow reverses in the pipe before the disc is in the fully closed position, the reverse flow will slam the disc into the seat and violent forces within the pipe and noise will result. The sudden stoppage of the reverse flow can also cause the phenomenon known as water hammer in the pipe. Accordingly, to avoid these problems, spring return mechanisms are often provided with resilient disc check valves. However, the currently-available spring return mechanisms include components that are external to the valve body and are also costly to fabricate.

Specifically, one currently-available spring return mechanism is sold under the APCO trademark by the Valve and Primer Corporation of Schaumburg, Ill. However, the design of this valve requires the valve body to be penetrated as the spring mechanism passes through the valve body and is contained within a spring housing that is mounted onto the top of the valve body. The penetration of the valve body in order to accommodate the spring mechanism reduces the reliability of the valve and increases the cost of manufacture. Further, because the spring mechanism is attached to the disc with fasteners that penetrate the disc, the disc is susceptible to leakage as well as a loss of integrity of the bonding material disposed on the upstream side of the disc which can lead to subsequent corrosion and failure of the valve. Further, the spring mechanism extends across the flow path of the valve body and is susceptible to catching debris in wastewater applications. A build up of such debris on the spring mechanism can prevent full rotation of the disc and thereby interfere with the operation of the valve.

Another type of commonly employed spring return mechanism for disc valves is sold by Dresser Manufacturing Division of Dresser Industries, Inc. of Anniston, Ala. One disadvantage of this type of spring mechanism is that the spring is mounted exterior to the valve. The spring biases the disc to a closed position via a lever and hinge pin connection. This type of external mechanism cannot be employed with a resilient disc because resilient discs require the hinge to remain stationary as the disc moves towards the open or closed position. Thus, in addition to requiring moving parts disposed outside of the valve body, which is ultimately unreliable and more costly, the afore noted design is not suitable for resilient disc check valves.

Therefore, there is a need for an improved spring return mechanism for resilient disc valves which will not require rotational or pivotal movement of the hinge or hinge pin and which will not require penetration of the valve body or the addition of any special type of housing on the valve body to accommodate the spring mechanism. Further, there is a need for a spring return mechanism for a resilient disc check valve which does not extend across the flow path and which therefore would not be susceptible to catching or retaining debris if used in wastewater applications. Further, there is a need for a spring return mechanism for a resilient disc valve that does not require a fastener or other means of attaching the spring element to the disc which requires penetration of the disc.

SUMMARY OF THE INVENTION

The present invention satisfies the afore noted needs by providing a check valve that comprises a valve body comprising an inlet and an outlet and a flow path between the inlet and the outlet. The valve body further comprises a recess for accommodating a hinge disposed transverse to the flow path. The hinge is connected to a disc for pivotal movement of the disc between a closed position whereby the outlet is isolated from the inlet and an open position that provides communication between the inlet and the outlet. The disc engages a spring which biases the disc towards the closed position. The spring further comprises a proximal end that extends around the hinge and engages the recess. The spring further comprises a distal end that engages the disc.

In an embodiment, the spring further comprises a middle portion disposed between the proximate and cistal ends. The middle portion extends along the disc in close proximity thereto.

In an embodiment, the recess further comprises a flat portion that engages the proximal end of the spring and prevents rotational movement of the proximal end of the spring.

In an embodiment, the spring is fabricated from high tensile strength stainless steel.

In an embodiment, the spring is disposed entirely within the valve body.

In an embodiment, the spring does not penetrate or pass through the disc.

In an embodiment, the disc is fabricated from a resilient polymer material.

In an embodiment, the disc comprises a proximal end that is connected to the hinge and a distal end that engages a distal side of the valve body when the disc is in the closed position. The distal end of the disc further engaging a proximal side of the disc when the valve body is in the open position. The proximal end of the disc and the hinge remain stationary during pivotal movement of the disc between the open and closed positions.

In an embodiment, the disc comprises a central portion and the distal end of the spring engages the central portion of the disc.

In an embodiment, the present invention provides a spring return resilient check valve that comprises a valve body comprising an inlet and an outlet and defining a flow path therebetween. The valve body further comprises a shaped recess for accommodating a hinge. The hinge is connected to a proximal end of a resilient disc. The disc comprises a distal end with a central portion disposed therebetween. The distal end and central portion of the disc pivoting between a closed position wherein the distal end of the disc engages an opposing side of the valve body and an open position where the distal end of the disc is disposed between the proximal end of the disc and the outlet. The recess also accommodates a proximal end of a spring that further comprises a distal end that engages the disc and biases the disc towards the closed position. The proximal end of the spring extends around the hinge and the proximal end of the disc. The hinge, the proximal end of the disc and the proximal end of the spring are frictionally accommodated in the recess and remain stationary as the disc moves between the open and closed positions.

In an embodiment, the present invention provides a check valve that comprises a valve body comprising an open inlet end and an open outlet end defining a flow path therebetween. The valve body also comprises a side opening that is closed by a plate. The plate is connected to the valve body and the plate and valve body define a shaped recess therebetween. The shaped recess accommodates an elongated hinge disposed transversely to the flow path. The hinge is connected to a proximal end of a resilient disc that also comprises a distal end. The distal end of the disc pivots between an open position and a closed position. The recess also accommodates a proximal end of a spring that further comprises a distal end that engages the disc and biases the disc towards the closed position. The proximal end of the spring, the hinge and the proximal end of the disc remain stationary in the recess as the distal end of the disc pivots between the open and closed positions.

It is therefore an advantage of the present invention to provide a resilient disc check valve with a return spring mechanism that is contained entirely within the valve body and requires no penetration of the valve body.

Another advantage of the present invention is that it provides a return mechanism for a resilient disc check valve that is disposed immediately behind the disc and therefore remains out of the flow path during operation and is therefore not subject to catching or collecting debris in wastewater applications.

Still another advantage of the present invention is that it provides a return spring mechanism for a resilient disc check valve that requires no fastening elements to attach the spring to the disc and therefore no penetration of the disc by any fastening element.

Yet another advantage of the present invention is that it provides a return mechanism for a resilient disc check valve that is inexpensive to fabricate and assemble.

Other objects and advantages of the present invention will become apparent upon reading the following detailed description and appended claims, and upon reference to the accompanying drawings.

BRIEF DESCRIPTION OF THE DRAWINGS

The present invention is illustrated more or less diagrammatically in the accompanying drawings, wherein.

Figure 1:
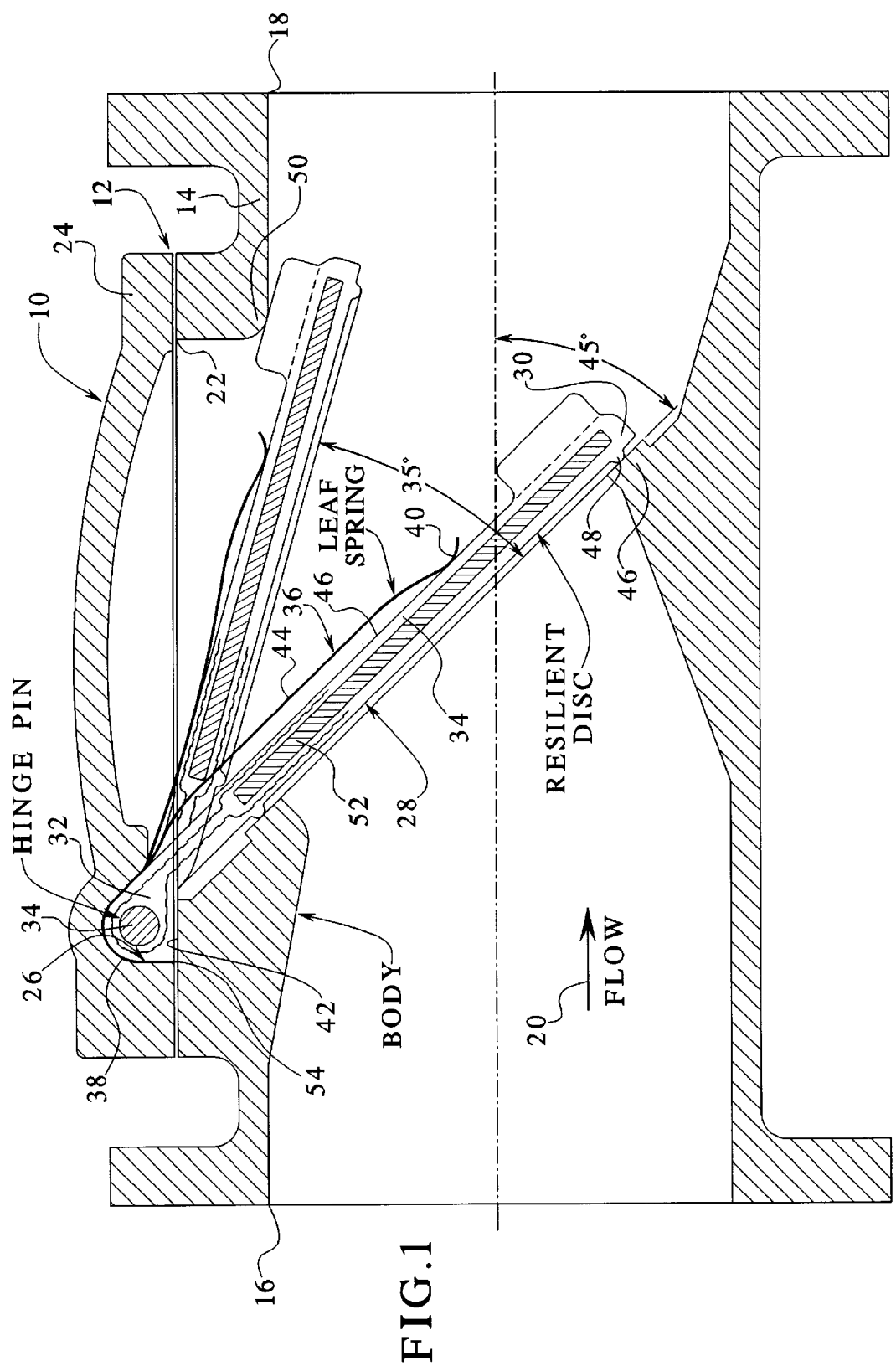
FIG. 1 is a sectional view of a valve body and spring biased resilient disc check valve made in accordance with the present invention and illustrating the disc and spring in both the open and closed positions.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Like reference numerals will be used to describe like or similar parts from figure to figure in the following description of the drawings.

Turning first to FIG. 1, a resilient disc check valve 10 is illustrated with a valve body 12 that includes a central or main portion 14 that includes an inlet 16 and an outlet 18. The main portion 14 also defines a flow path indicated by an arrow 20. Further, the main portion 14 of the valve body 12 includes a top opening 22 that is closed by a cover 24. The engagement between the cover 24 and the main portion 14 of the valve body 12 defines a recess 26.

The valve 10 also includes a resilient disc member 28 that includes a distal end 30, a proximal end 32 and a central portion 34. The proximal end 32 is connected to a pin 34. Both the proximal end 32 and pin 34 are accommodated in the recess 26.

The disc 28 is biased into the closed position by a spring 36 which also includes a proximal end 38 as well as a distal end 40. The proximal end 38 of the spring 36 extends around the proximal end 32 of the disc 28 and also engages a flat portion 42 of the recess 26 that is provided by the main portion 14 of the valve body 12. As shown in FIG. 1, pivotal movement of the spring 36 between the closed position, or the lower position shown in FIG. 1, to the open position or upper position shown in FIG. 1, does not result in rotation or pivotal movement of the proximal end 38 of the spring 36 due to the engagement of the proximal end 38 of the spring 36 with the flat portion 42 of the recess 26.

Further, it will be noted that the spring 36 includes a central portion 44 that extends along a rear side 46 of the disc 28 and in close proximity thereto. As a result, the spring 36 either is in direct engagement with the disc 28 or disposed immediately adjacent to the disc 28 and, consequently, the spring 36 is not susceptible to catching or accumulating debris flowing through the valve body 12 either in a forward or reverse direction.

In addition to the proximal end 38 of the spring 36 remaining stationary in the recess 26 during pivotal movement of the disc 28 from the closed to the open position, the proximal end 32 of the disc 28 as well as the pin 34 also remain stationary during movement of the disc 28 from the closed to the open position and vice versa. Thus, the proximal end 38 of the spring 36, the pin 34 and the proximal end 32 of the disc 28 are snugly or frictionally accommodated in the recess 26.

It will also be noted that the valve body 12 includes a seat 46 for engaging the seating surface of the disc 28 which may also include a sealing bead 48. Further, the valve body 12 may include a similar stop structure 50 for engaging the disc 28 as it moves to the open position.

The disc 28 is fabricated from a resilient polymer material. The hinge pin 34 is embedded in the distal end 32 of the disc 28. Further, a stiffening element 52 may also be employed to add structural integrity to the disc 28 as well as weight.

Figure 2:
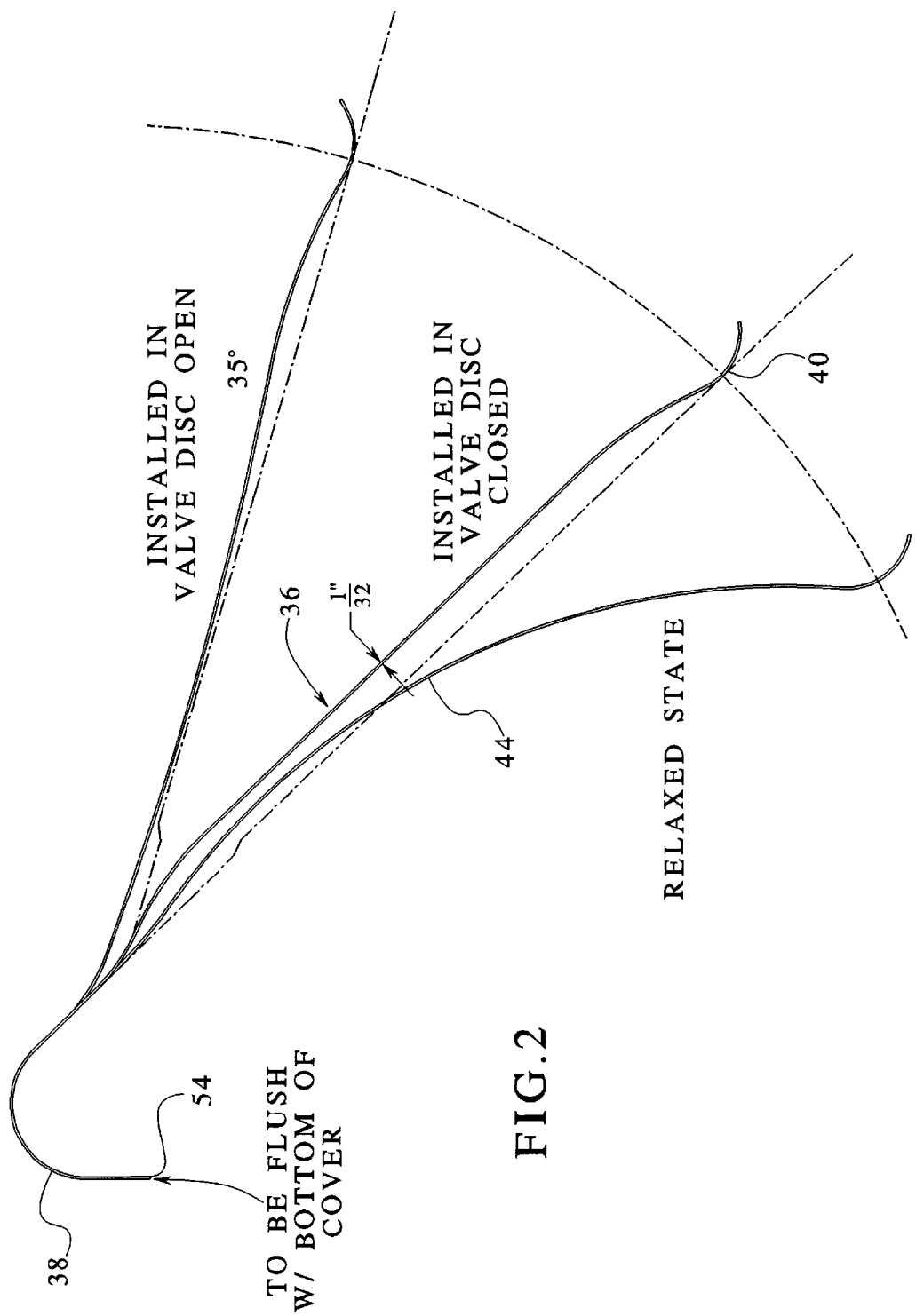
FIG. 2 is a side view of the spring mechanism shown in FIG. 1.

Details of the construction of the leaf spring 36 are further illustrated in FIG. 2. Specifically, the tip 54 of the proximal end 38 of the spring 36 engages the main portion 14 of the valve body 12 as shown in FIG. 1 and prevents any rotation or pivotal movement of the proximal end 38 of the spring 36. In a relaxed state, the middle portion 44 of the spring 36 is arched as shown in the left in FIG. 2. As a result, upon installation, the spring 36 engages the disc 28 (see FIG. 1) and assumes the position shown in the middle of FIG. 2. Upon flow through the valve body 12 from the inlet 16 to the outlet 18 (see FIG. 1), the disc assumes the position shown towards the upper right in FIG. 2. The distal end 40 of the spring 36 is curved so that it will not damage the surface 46 of the disc 28. An additional spring (not shown) may be stacked on top of the spring 36 to provide a stronger closing force.

The spring 36 is fabricated from high tensile strength spring stainless steel sheet material. The spring 36 can be stamped from the sheet and easily formed with a die. The thickness of the spring is relatively small, e.g. 1/32 inch, which provides a high degree of flexibility. The length and width of the spring 36 is selected to match the general geometry of the valve 10. Specifically, the spring 36 should be long enough to contact the central portion 34 of the disc 28, or extend to just past the central portion 34 of the disc 28 as shown in FIG. 1. The width of the spring 36 can vary from 1 inch to 24 inches, depending upon the size of the valve 10 and the desired force imposed. For extreme flow reversal conditions, the spring 36 can be augmented with an additional spring or springs to provide additional force.

Accordingly, an improved valve is provided whereby a resilient disc 28 is employed with a spring return mechanism in the form of a spring 36 that is accommodated entirely within the valve body 12. No penetration or passing through of the valve body 12 is required thereby providing a more reliable and durable valve. Further, the mechanism is relatively simple and therefore easy to manufacture at a low cost. Further, the spring 36 merely engages the disc 28 and requires no penetration or connection by way of fasteners to the disc 28 which, as discussed above, can cause failure of the seal over time.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A check valve comprising:
    a valve body comprising an inlet and an outlet and defining a flow path therebetween, the valve body further comprising a recess for accommodating a hinge disposed transverse to the flow path,
    the hinge being connected to a disc for pivotal movement of the disc between a closed position isolating the outlet from the inlet and an open position providing communication between the inlet and outlet,
    the disc engaging a spring, the spring biasing the disc towards the closed position, the spring further comprising a proximal end that extends around the hinge and abuttingly engages the recess without penetrating the valve body, the spring further comprising a distal end that engages the disc, the spring not being fastened to the valve body,
    further comprising a flat portion that engages the proximal end of the spring and prevents rotational movement of the proximal end of the spring.

2. The check valve of claim 1 wherein the spring further comprises a middle portion disposed between the proximal and distal ends, the middle portion extending along the disc in close proximity thereto.

3. The check valve of claim 1 wherein the spring is fabricated from high tensile strength stainless steel.

4. The check valve of claim 1 wherein the spring is disposed entirely within the valve body.

5. The check valve of claim 1 wherein the spring does not penetrate or pass through the disc.

6. The check valve of claim 1 wherein the spring comprises a curved distal end that engages the disc.

7. The check valve of claim 1 further comprising a second spring stacked on top of the spring that engages the disc.

8. The check valve of claim 1 wherein the disc is fabricated from a resilient polymer material.

9. The check valve of claim 1 wherein the disc comprises a proximal end that is connected to the hinge and a distal end that engages the distal side of the valve body when the disc is in the closed position and a proximal side of the valve body when the disc is in the open position,
    the proximal end of the disc and the hinge remaining stationary during pivotal movement of the disc between the open and closed positions.

10. The check valve of claim 1 wherein the disc comprises a central portion, the distal end of the spring engaging the central portion of the disc.

11. A spring return resilient check valve comprising:
    a valve body comprising an inlet and an outlet and defining a flow path therebetween, the valve body further comprising a shaped recess for accommodating a hinge, the hinge being connected to a proximal end of a resilient disc, the disc comprising a distal end with a central portion disposed therebetween, the distal end and central portion of the disc pivoting between a closed position where the distal end of the disc engages an opposing side of the valve body and an open position where the distal end of the disc is disposed between the proximal end of the disc and the outlet, the recess also accommodating a proximal end of a spring that further comprises a distal end that engages the disc and biases the disc towards the closed position, the proximal end of the spring extending around the hinge and the proximal end of the disc,
    the proximal end of the spring extending around the hinge and abuttingly engaging a flat portion of the recess without penetrating the valve body, the flat portion of the recess preventing rotational movement of the proximal end of the spring, the spring not being fastened to the valve body,
    the hinge, the proximal end of the disc and the proximal end of the spring being frictionally accommodated in the recess and remaining stationary as the disc moves between the open and closed positions.

12. The check valve of claim 11 wherein the spring further comprises a middle portion disposed between the proximal and distal ends, the middle portion extending along the disc in close proximity thereto.

13. The check valve of claim 11 wherein the spring is disposed entirely within the valve body.

14. The check valve of claim 11 wherein the disc comprises a central portion, the distal end of the spring engaging the central portion of the disc.

15. A spring return resilient check valve comprising:
    a valve body comprising an inlet and an outlet and defining a flow path therebetween, the valve body further comprising a shaped recess for accommodating a hinge, the hinge being connected to a proximal end of a resilient disc, the disc comprising a distal end with a central portion disposed therebetween, the distal end and central portion of the disc pivoting between a closed position where the distal end of the disc engages an opposing side of the valve body and an open position where the distal end of the disc is disposed between the proximal end of the disc and the outlet, the recess also accommodating a proximal end of a spring that further comprises a distal end that engages the disc and biases the disc towards the closed position, the proximal end of the spring extending around the hinge and the proximal end of the disc, the hinge, the proximal end of the disc and the proximal end of the spring being frictionally accommodated in the recess and remaining stationary as the disc moves between the open and closed positions, wherein the spring does not penetrate or pass through the disc.

16. A check valve comprising:

a valve body comprising an open inlet end and an open outlet end defining a flow path therebetween, the valve body also comprising a top opening that engages a cover, the cover being connected to the valve body and defining a shaped recess between the valve body and the cover for accommodating an elongated hinge disposed transversely to the flow path, the hinge being connected to a proximal end of a resilient disc that also comprises a distal end, the distal end of the disc being pivotal between an open position and a closed position, the recess also accommodating a proximal end of a spring that further comprises a distal end that engages the disc and biases the disc towards the closed position, the proximal end of the spring extending around the hinge and abuttingly engaging a flat portion of the recess without penetrating the valve body, the flat portion of the recess preventing rotational movement of the proximal end of the spring, the spring not being fastened to the valve body, the proximal end of the spring, the hinge and the proximal end of the disc remaining stationary in the recess as the distal end of the disc pivots between the open and closed positions.

17. The check valve of claim 16 wherein the spring further comprises a middle portion disposed between the proximal and distal ends, the middle portion extending along the disc in close proximity thereto.

18. The check valve of claim 16 wherein the spring is disposed entirely within the valve body.

19. A check valve comprising:

a valve body comprising an open inlet end and an open outlet end defining a flow path therebetween, the valve body also comprising a top opening that engages a cover, the cover being connected to the valve body and defining a shaped recess between the valve body and the over for accommodating an elongated hinge disposed transversely to the flow path, the hinge being connected to a proximal end of a resilient disc that also comprises a distal end, the distal end of the disc being pivotal between an open position and a closed position, the recess also accommodating a proximal end of a spring that further comprises a distal end that engages the disc and biases the disc towards the closed position, the proximal end of the spring, the hinge and the proximal end of the disc remaining stationary in the recess as the distal end of the disc pivots between the open and closed positions, wherein the spring does not penetrate or pass through the disc.

* * * * *